United States Patent Office 3,268,639
Patented August 23, 1966

3,268,639
METHODS FOR MANUFACTURING
TRANSFER MATERIALS
Lewis G. Taft, Endwell, N.Y., assignor to International
Business Machines Corporation, New York, N.Y., a corporation of New York
No Drawing. Filed Dec. 26, 1963, Ser. No. 333,726
3 Claims. (Cl. 264—78)

The present invention generally relates to a method for making transfer materials and their manufacture. More specifically, the invention is directed to self-supporting transfer materials, such as typewriter ribbons.

Several varieties of transfer ribbons are in widespread use as typewriter ribbons or similar articles. One of the most familiar comprises a fabric ribbon made of absorbent material and impregnated with a somewhat viscous marking composition. In more recent years, ribbons have been developed which comprise backings of plastic, such as polyethylene, Mylar, or the like, coated on one surface with an ink composition.

Still more recently, effort has been directed to the development of transfer ribbons or the like comprising a backing coated with an ink which is the residue of a composition comprising a plastic, an ink and a solvent for the plastic. This composition is coated on the backing and the solvent is evaporated, leaving the ink entrapped in the plastic. Complex plastisol and organosol systems have also been employed to form porous ink-filled structures.

It has generally been found that the ink impregnated fabric ribbons do not have sufficiently long life and that the images produced by them are not as sharp and clear as might be desired.

As for the ribbons comprising plastic backings or substrates, there are serious problems involved in obtaining good adhesion of the ink to the backing. This problem may be due to the surface polarity of polyethylene and other synthetic plastics which tend to repel many ink compositions.

The use of an ink containing a solvent for the plastic backing has solved this problem to a certain degree. By using a compound that is a mutual solvent both for the ink and for the plastic of the backing, solvent bonding of the ink to the substrate can be achieved. However, the manufacture of such products is complicated by the use of volatile solvents which may present health or safety hazards, if the solvent vapors are toxic or combustible. Even if the solvent are entirely safe to use, the economics of large scale commercial production requires that special precautions be taken and that apparatus be provided to recover and recycle the vapors.

In view of the disadvantages associated with the manufacture of convention transfer materials, an object of the present invention is to produce new and improved transfer ribbons and methods for their manufacture.

A further object of the present invention is to produce new transfer materials which do not require a backing or support.

Another object of the present invention is to produce new transfer materials having long life and the ability to produce intense and sharply defined images.

An additional object of the present invention is to provide a new and efficient method for producing self-supporting transfer materials without the necessity to provide for the handling and recovery of volatile solvents.

Additional highly desirable objects and advantages of the present invention will be apparent in view of the following detailed description of the invention.

The present invention will be more full understood also in view of the following description of certain preferred embodiments of the invention.

In general, the present invention comprises physically mixing a thermoplastic, a plasticizer which is incompatible with the plastic at about room temperature (20°–25° C.) and an organic coloring matter, such as a dye, which is soluble in the plasticizer. The composition is worked, with heating if necessary, until a thorough, homogeneous mixture is produced and this mixture is then formed into sheets, films or ribbons. The incompatible plasticizer and dissolved dye separate from and form a film on the surface of the thermoplastic sheet. This film of dye-containing plasticizer can then be transferred from the surface to the thermoplastic sheet under pressure, such as the impact of a type bar or stylus.

The term "incompatible plasticizer" as used in the present description and the following claims has a specific meaning. Compatibility between a plastic and a plasticizer for the purpose of the present description is determined in the following manner.

The plastic and the plasticizer are mixed in the proportions in which it is desired to use them in making the self-supporting transfer materials of the invention. This mixture is then warmed and mixed until a homogeneous melt is produced. A few drops of the melt are then placed on a glass plate and another glass plate is placed over the drops and is pressed to form a thin film. The glass plates and the thin film of the thermoplastic-plasticizer composition between the plates are then brought to room temperature. If the thin film becomes visibly cloudy, the plasticizer and thermoplastic are incompatible at room temperature in the proportions in which they are mixed. If the film remains clear, they are compatible. If only a very faint hazing of the film is apparent, the system may be referred to as partially compatible.

This procedure is a well recognized and convenient test for the compatibility of plastics and plasticizers.

The plastic material used in the present transfer elements may be any natural or synthetic thermoplastic which is capable of being formed into self-supporting ribbons, films or sheets. Suitable thermoplastics, for example, include nylon, polyvinyl chloride, ethylene, propylene, cellulose acetate, cellulose butyrate and many other polymers and co-polymers. The thermoplastic may be mixed with the plasticizer in any convenient form, such as powder or chips.

The coloring component of the composition used to form the present transfer elements preferably is an organic dye which is soluble in the plasticizer. Such dyes include Oil Blue Black, Nubian Resin Black and the like. A large number of other suitable dyes are commercially available.

The plasticizers useful in the invention are a well known class of organic compounds which, when mixed with plastic, soften and improve the flexibility of the plastics. They are generally non-volatile organic liquids or low melting solids, such as phthalate, adipate and sebacate esters and aryl phosphate esters.

The thermoplastic will comprise at least about 20% by weight of the composition and frequently as high as 75% by weight. The plasticizer may be present in relatively small amounts, such as about 5% by weight, or may comprise a substantial portion of the composition, such as up to about 50% by weight. The amount of dye in the composition may vary, but will ordinarily be in the range of from about 5% to 25% by weight.

The transfer elements are formed by physically mixing the thermoplastic, plasticizer and dye until a uniform mixture is produced. The formation of ribbons or sheets is then preferably accomplished by extrusion of the mixture through a slot. To facilitate extrusion, heat may be furnished to soften the plastic.

The strip or sheet is then drawn, quenched, if necessary, and is then cut into the desired shapes.

Since the tensile strength and other properties of a number of thermoplastics are improved by stretching, a stretching step is preferably included in the sheet formation.

In selecting a thermoplastic-plasticizer system for use in the invention, the previously described test for compatibility is employed. The following table indicates the compatibility (C), incompatibility (I), or partial compatibility (PC) of a large number of plasticizers with a specific thermoplastic, i.e., nylon. A commercially available nylon known as Zytel 61 was used in these determinations.

TABLE 1.—NYLON-PLASTICIZER SYSTEMS

| 10% plasticizer: | Compatibility |
|---|---|
| Diphenyl phthalate | C |
| Hexadecyl stearate | I |
| Dioctyl phthalate | I |
| Dibutyl phthalate | C |
| Tricresyl phosphate | I |
| Flexol 2 GB | I |
| Triol 230 | PC |
| Flexol 8HP | I |
| Flexol CC-55 | I |
| Ethyl lactate | I |
| Santicizer 9 | C |
| Santicizer 1-H | C |
| Santicizer 3 | C |
| Octyl dihydrogen phosphate | C |
| Butyl Cellosolve stearate | I |
| Santicizer 160 | PC |
| Trioctyl phosphate | I |
| Paraplex AP-292 | I |
| Paraplex G-20 | I |
| Polyethylene glycol 400 monolaurate | I |
| Triethanolamine | PC |
| Flexol EPO | I |
| Santicizer 8 | C |
| Triethylene glycol | PC |
| Monoplex DOS | I |
| Dow Polyglycol B-500 | PC |
| Monoplex S-38 | I |
| Paraplex RG-10 | I |
| Hexylene glycol | C |
| Octylene glycol | PC |
| n-Butyl benzoate | PC |
| 2-methoxymethyl-2,4-dimethyl pentanediol-1,5 | C |
| Hexanetriol-1,2,6 | C |
| Propylene glycol | PC |
| Sucrose acetate isobutyrate | I |
| Texanol isobutyrate | I |
| Santicizer HB-40 | PC |
| Santicizer M-17 | C |
| Santicizer 140 | C |
| Santicizer B-16 | I |
| Santicizer E-15 | PC |
| 20% plasticizer: | |
| Santicizer M-17 | PC |
| Santicizer 140 | I |
| Dibutyl phthalate | I |
| Hexylene glycol | I |
| 2-methoxymethyl-2,4-dimethyl pentanediol-1,5 | I |
| Hexanetriol-1,2,6 | I |
| Sancticizer 8 | C |
| Octyl dihydrogen phosphate | C |
| 30% plasticizer: | |
| Santicizer M-17 | I |
| Santicizer 8 | I |
| Octyl dihydrogen phosphate | C |
| 50% plasticizer: | |
| Octyl dihydrogen phosphate | C |

As will be seen from Table 1, for any given thermoplastic such as nylon, there are a number of plasticizers which are incompatible when mixed in a certain proportion. It is also apparent that a plasticizer that is compatible at one concentration may be incompatible at a higher concentration, e.g., Santicizer 140, which is compatible at 10%, but is incompatible at 20%.

Thus, in the case of each thermoplastic, the previously described test may be applied to determine which specific plasticizers are suitable for use with that thermoplastic.

The following are examples illustrating the preparation of transfer elements in accordance with the present invention.

*Example 1*

A physical mixture is prepared from 70 gms. of nylon, 15 gms. of tricresyl phosphate and 15 gms. of Oil Blue Black ZBC. The ingredients are worked into a uniform mixture and are extruded at about 300° F. The extruded web, having a thickness of about 10 mils is then picked up, drawn through a water quenching bath and its stretched down to a thickness of about 2 mils by being pulled rapidly between rollers.

*Example 2*

The procedure of Example 1 is repeated with a mixture of 10 gms. hexadecyl stearate, 15 gms. Nubian Resin Black and 75 gms. of nylon.

*Example 3*

The procedure of Example 1 is repeated with a mixture of 30 gms. triphenyl phosphate, 60 gms. cellulose acetate and 10 gms. Oil Blue Black.

*Example 4*

The procedure of Example 1 is repeated with a mixture of 50 gms. Paraplex G-54, 45 gms. polyvinyl butyral and 5 gms. Nubian Resin Black.

*Example 5*

The procedure of Example 1 is repeated with a mixture of 25 gms. Aroclor 5460, 65 gms. polyethylene and 10 gms. Oil Blue Black.

*Example 6*

The procedure of Example 1 is repeated with a mixture of 25 gms. Aroclor 1248, 65 gms. polyvinyl chloride and 10 gms. Nubian Resin Black.

*Example 7*

The procedure of Example 1 is repeated with a mixture of 80 gms. nylon, 15 gms. Oil Blue Black ZBC and 5 gms. sucrose acetate isobutyrate.

As will be seen from the foregoing examples, almost limitless combinations of ingredients are possible in formulating the present compositions. The essence of the invention, however, is that, in the proportions combined, the plasticizer must be incompatible in the thermoplastic when in the form of a sheet or film at room temperature and the dye must be soluble in the plasticizer.

In this way, self-supporting transfer elements may be made in an efficient manner without having to manipulate volatile solvents or cope with more complicated organosol or plastisol systems.

It will be apparent to those skilled in the art that various modifications may be made in the embodiments of the invention included in the preceding description without departing from the scope or spirit of the invention as expressed in the following claims.

What is claimed is:

1. A method for producing a self-supporting transfer element comprising:

heating and mixing from about 20 to 75 percent by weight of a thermoplastic polymer, up to about 50 percent by weight of a plasticizer which is incompatible with said polymer at about room temperature and an organic dye which is soluble in said plasticizer to form a homogeneous mixture, forming said mixture into a flat sheet, and bringing said sheet to about room temperature to exude a solution of said dye in said plasticizer and thus form a pressure transferable film on the surface of said sheet.

2. A method for producing a self-supporting transfer element comprising:

heating and mixing from about 20 to 75 percent by weight of a thermoplastic polymer, up to about 50 percent by weight of a plasticizer which is incompatible with said polymer at about room temperature and an organic dye which is soluble in said plasticizer to form a homogeneous mixture, forming said mixture into a flat sheet, stretching said sheet to increase its tensile strength, and bringing said sheet to about room temperature to exude a solution of said dye in said plasticizer and thus form a pressure transferable film on the surface of said sheet.

3. The method of claim 2 wherein said thermoplastic polymer is nylon.

References Cited by the Examiner
UNITED STATES PATENTS

| | | | |
|---|---|---|---|
| 2,364,435 | 12/1944 | Foster et al. | 264—288 |
| 2,777,824 | 1/1957 | Leeds | 260—2.5 |
| 3,101,668 | 8/1963 | Leeds | 101—401.1 |

OTHER REFERENCES

Simonds, Weith, and Bigelow, Handbook of Plastics, 2nd Edition, 1949, page 362, D. Van Nostrand Co., Inc., Princeton, N.J.

ALEXANDER H. BRODMERKEL, *Primary Examiner.*

B. SNYDER, *Assistant Examiner.*